United States Patent Office 3,436,473
Patented Apr. 1, 1969

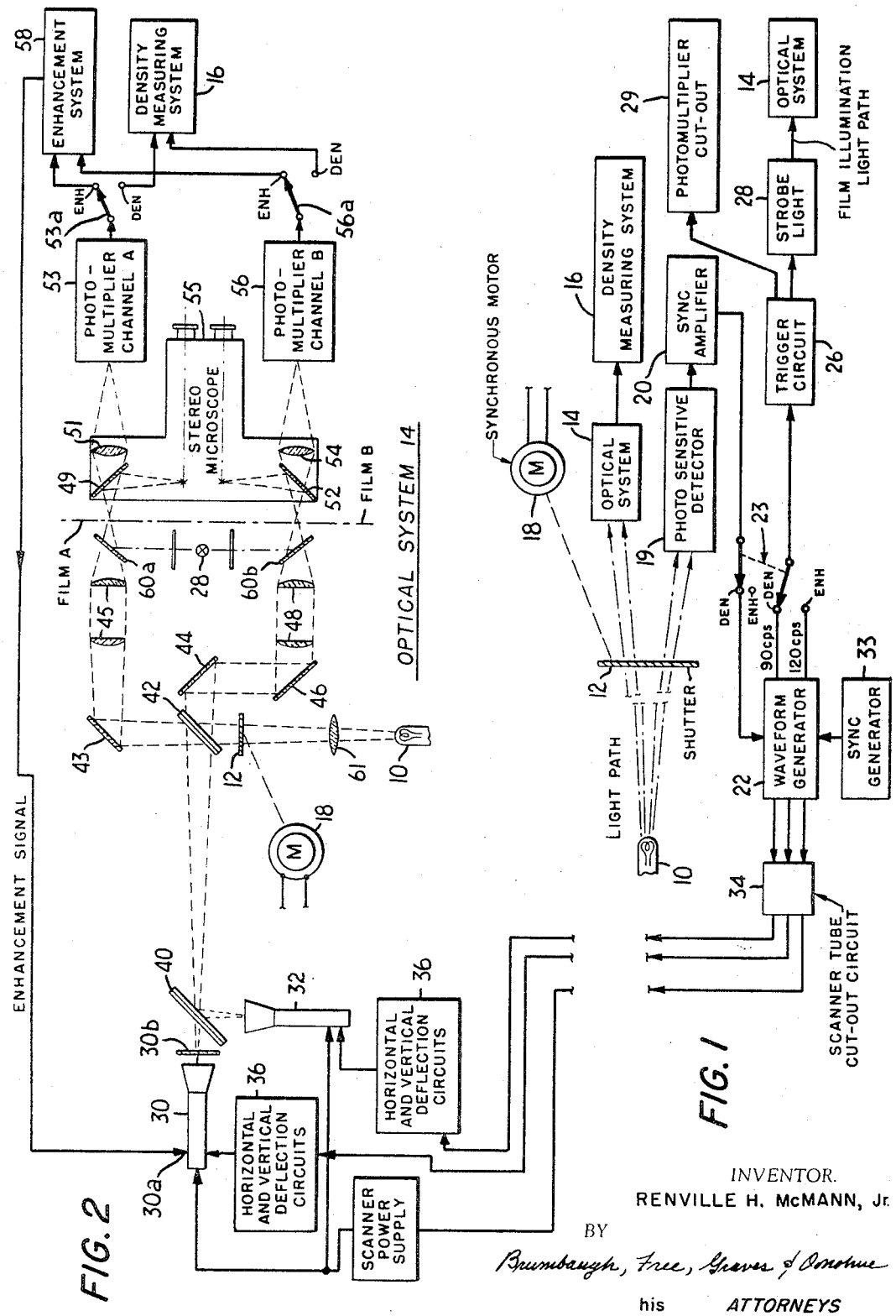

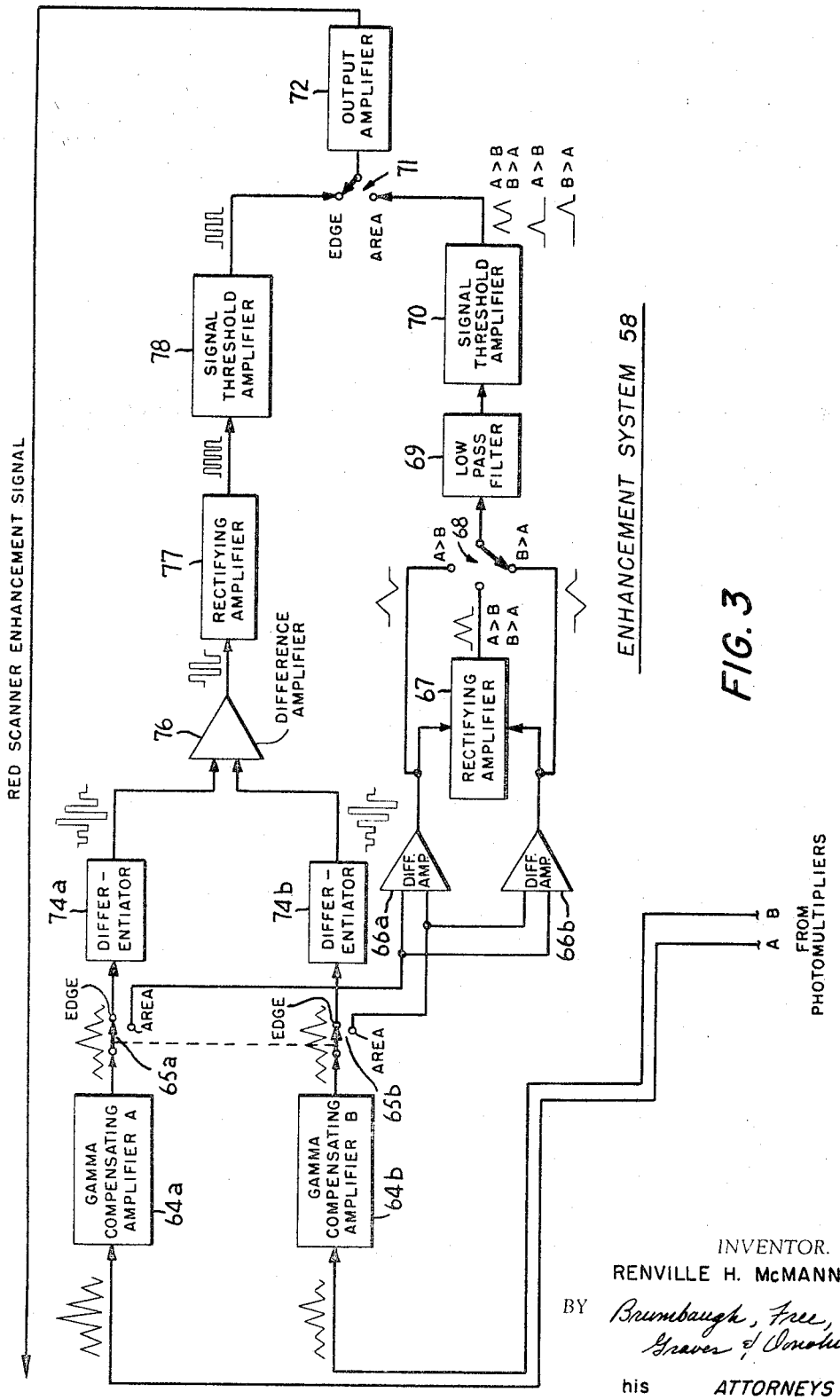

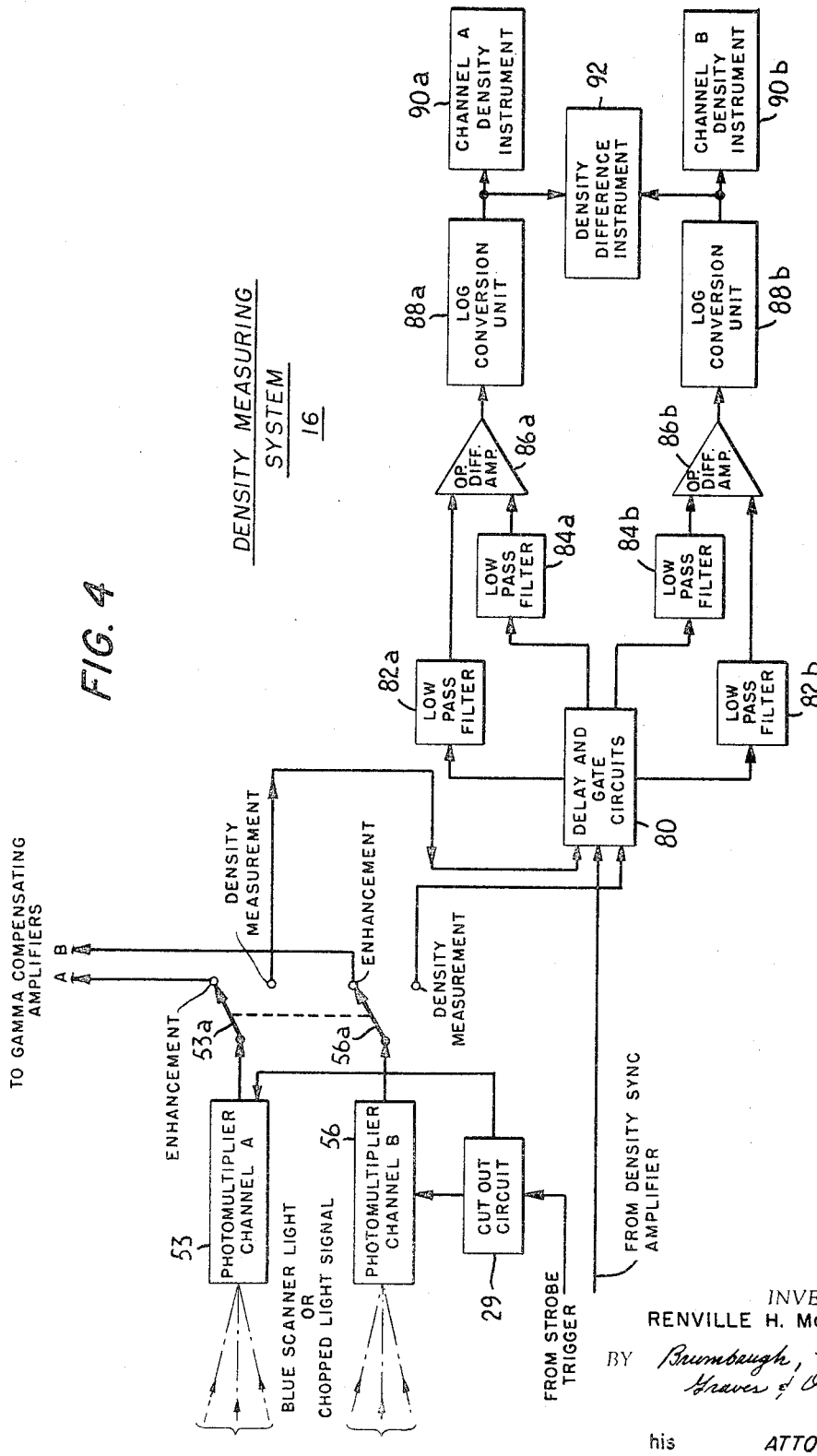

3,436,473
RECORD ANALYZING AND VIEWING APPARATUS
Renville H. McMann, Jr., New Canaan, Conn., assignor to Columbia Broadcasting System, Inc., New York, N.Y., a corporation of New York
Filed June 30, 1965, Ser. No. 468,233
Int. Cl. H04n 3/02, 3/28
U.S. Cl. 178—6.8                                          17 Claims

ABSTRACT OF THE DISCLOSURE

An apparatus and method for comparing and analyzing information contained on photographic film and the like, in which corresponding image areas to be compared are simultaneously scanned by a scanning beam of a given spectral content to generate video signals, the latter being compared to produce a difference signal. A second scanning beam of a different spectral content and scanning in synchronous registration with the first scanning beam is modulated in intensity by the difference signal. Light from the second scanning beam is directed to a viewing microscope, which also receives periodically illuminated images of the areas under comparison so that such area images and an image of the second scanning beam are superimposed in the microscope. This produces an image overlay of a distinctive color so that any differences of information in the areas may be readily discerned by visual inspection. When the image overlay is not desired, a periodically interrupted beam of light may be directed through the film and sensed by photodetectors to generate signals proportional to the optical density of the film.

---

The invention relates to the analysis of information-bearing records, and more particularly to an apparatus and method by which two or more information areas on such records may be visually and electronically compared in detail.

There has long been a basic need for a device which is capable of making microscopically accurate comparisons of graphic information recorded on film, photographs or the like, and which, at the same time permits visual observation of the film or photograph specimens under comparison. Desirably, such a device should make possible an accurate comparison of the photographic information and a visual presentation of the specimens under comparison, contemporaneously with a visual presentation or measurement of incongruities in the specimens. A major problem encountered in fulfilling this goal in the past has been the inherent limitations of any electronic system simultaneously to compare densities or light transmissivities of film negatives for example, and to present those differences by visually enhancing those portions of the recorded information in which the differences exist. Also, some difficulty has been experienced in attempting to view such films simultaneously while making density measurements or while visually displaying density or light transmission differences in the films. This is owing to the fact that any light used for illumination of the specimens under comparison must be selectively shunted, by one method or another, away from any photosensitive means employed for sensing the response of such specimens to radiant energy from a comparison source.

These devices find practical application in, for instance, the comparison of aerial photographs of the same subject matter where minute discrepancies in image densities for corresponding elemental image areas are meaningful. A difference in the image densities at corresponding locations on two film negatives of the same subject may represent, for example, an actual change in the subject matter which has occurred in the interval between the times when the two photographs were taken. One approach that was previously suggested for obtaining simultaneous visual observation and density or transmission comparisons was first to view the film by conventional optics, turn off the optics (including the film illumination means), electronically scan the information recorded on the film, store the resultant video signal on a storage tube, and lastly, turn on the optics and superimpose the stored signal onto the optical image. This approach necessitates the use of additional equipment for storage and information playback and, because the viewing and scanning operations are effected sequentially, is subject to inaccuracies in registration which may result in erroneous interpretation of the films.

The invention, on the other hand, achieves the above-mentioned objects by electronically scanning two or more strips of film, photographs or the like, with a radiant energy beam, comparing the resultant video signals, and simultaneously enhancing the film or photograph images by projecting onto the specimens under comparison an intensity-modulated beam from independent scanning means, the beam intensity of which is controlled by a composite signal representing the differences between the compared video signals. A separate illuminating source, multiplexed on a time-sharing basis with the scanning means, illuminates the specimens under comparison. In another mode of operation, film density measurements are made while viewing the specimens by similarly multiplexing the illumination source with the density measuring circuitry.

Thus, basically, the transmissivity or reflectivity response of the strips to a radiant energy beam, such as a beam of light, may be detected by means responsive to such transmissivity or reflectivity. The detected signals can then be employed in either of two ways: (1) the signals can be compared and used to present a visual display of the compared signals ("enhancement" mode); or (2) the signals, having a determinable relationship to the image density of the information recorded on the film or photograph, can be converted for direct measurement of density ("densitometer" mode). In either case, the radiant energy used as a source for obtaining information signals is multiplexed, i.e., switched on a time-sharing basis with an illumination source.

Although the invention has been described, a better understanding of it may be obtained from the following detailed description, taken in conjunction with the accompanying drawings in which:

FIGURE 1 is a block diagram of the signal generating system of an apparatus constructed according to the invention;

FIGURE 2 is a block diagram of an apparatus constructed in accordance with the invention and showing schematically the optical system in detail; and FIGURES 3 and 4 are detailed block diagrams of the enhancement system and the density measuring system, respectively.

Referring now to FIGURE 1, there is shown the basic signal generating system, which includes a light source 10, a revolving shutter 12 through which light from source 10 must pass to reach an optical system 14, and the density measuring system 16. The shutter 12 may comprise three equi-angularly spaced-apart blades driven by a synchronous motor 18 running at 1800 r.p.m., providing equal on and off times and interrupting light from the source 10 at 90 cycles per second (c.p.s.).

The film or films to be compared are mounted on a film table (not shown) in the optical system 14, which can be mechanically driven to move the two films in unison, so that selected segmental areas of each film are illuminated by the chopped light from source 10. Assuming for purposes of discussion that two film strips are being compared, the light enters the optical system 14 and impinges upon each film strip; thereafter, the chopped light transmitted by the film enters the density measuring system 16. This chopped light signal is utilized in the "density measurement," or "densitometer," mode of operation as a known source from which densities of selected areas of the films can ultimately be determined.

Referring momentarily to FIGURE 2, the optical system 14 includes conventional stereo microscope through which the operator of the apparatus may view segmental areas of the films. Illumination of the film for viewing takes place during a portion of the chopped light cycle in which the density measuring system 16 receives no light signal. This is done so that the photosensitive elements and the density measuring system will not erroneously detect light from the illuminating source, but only from the chopped light transmitted by the films. Additionally, the photosensitive measuring elements, in this case photomultipliers, are cut off during the film illumination to assure error-free sensing and to protect them from being over-driven.

Returning to FIGURE 1, an illumination trigger includes a photosensitive detector 19 for sensing a portion of the chopped light from light source 10. The output of the photosensitive detector 19 drives a synchronizing amplifier 20, the output of which provides a synchronizing signal through the switch 23 to a waveform generator 22. With the switch 23 positioned for the densitometer mode of operation, a properly shaped 90 c.p.s. signal appears at the output of the waveform generator 22 and feeds a triggering unit 26. The output of the triggering unit 26 is then used to trigger a strobe light 28, which is the illuminating source permitting visual observation of the films within the optical system 14. Illumination triggering thus occurs only when one of the blades of shutter 12 blocks the passage of light from source 10 to the optical system 14. Moreover, the triggering and chopped light signal are maintained in synchronism, since each signal derives from the interruption of the source 10 light path by shutter 12.

In addition to triggering the strobe light 28, the trigger circuit furnishes a signal to a photomultiplier cut-out unit 29. This unit may be suitably by any means adapted to deenergize the photomultipliers during the strobe light illumination interval. Illustratively, the photomultiplier supply voltage may be cancelled during the illumination interval by adding to the photomultiplier supply (not shown) an oppositely polarized pulse generated in the cut-out unit 29.

FIGURE 2 shows the basic optical system for the apparatus. With the switch 23 positioned for the enhancement mode of operation, the motor-driven shutter 12 and light source 10, along with their associated circuitry, are not used. Instead, a 120 c.p.s. signal from the waveform generator 22 is selected for strobe light triggering.

In addition to the 120 c.p.s. signal, two other signal frequencies are provided by the waveform generator 22 for driving the horizontal and vertical deflection circuits 36 of two cathode ray flying spot scanner tubes 30 and 32. Timing pulses for these signals are derived in the synchronous generator 33, in a manner well known to those skilled in the art, and applied to the waveform generator which then conventionally shapes the synchronous generator pulses to the desired waveforms. Typically each scanner tube scans a square (3″ x 3″) line-by-line pattern, or raster, and may be capable of horizontal and vertical resolutions of 16 line pairs per millimeter at 15% contrast. In accordance with the scanner tube resolution capabilities, the synchronous and waveform generator provides conventional horizontal and vertical scanning signals of 3240 c.p.s. and .9 c.p.s., respectively. Horizontal and vertical blanking signals are also developed by the waveform generator 22 and combined with the scanning signals.

Referring to FIGURES 1 and 2, a scanner tube cut-out unit 34, which may be conveniently a switch, receives the basic horizontal and vertical deflection waveforms from the waveform generator 22 before they are applied to the scanner tube deflection circuits 36. This cut-out unit 34 interrupts the horizontal and vertical deflection signals, as well as the scanner tube power supply, during the densitometer mode of operation.

In brief, the scanner tube 32 scans a raster pattern with a small, constant-intensity beam of predominantly blue light. This beam is optically divided so that the pattern is focused on corresponding selected areas of each of the films which are mounted on the positionable film table (not shown). Photosensitive elements detect the light transmitted by each film record and develop video information signals representative of the information carried on the films. These video signals are then compared to produce a difference signal. The second scanning tube 30 scans a raster identical with that of the first scanner tube, except that in conjunction with a color selective filter, the color of this scanning beam, similarly divided and focused on the film in superimposed relation to the "blue" beam, is red. The difference signal is employed to modulate the intensity of the "red" beam in accordance with the instantaneously compared video information differences. The red beam is diverted from the photosensitive elements into the viewing apparatus, such as the stereomicroscope used with the embodiment of the invention more fully described hereinafter. In this way, the "red" beam produces a visual "picture" of the comparison of the light transmissivities of the film records.

The operation of the apparatus in the enhancement mode may be explained as follows: The scanner tube 32 (FIG. 2) scans a line-by-line pattern with a narrow beam of essentially blue light. The scanning light beam traverses an optical path beginning with a neutral beam splitter 40 which reflects the light beam to a second neutral beam splitter 42, where the blue light beam splits into two paths. A portion of the blue light intensity is transmitted by the neutral beam splitter 42, reflected by mirrors 44 and 46, and passed through a focusing lens pair 48. Thereafter, it impinges upon one of the films B being analyzed and passes through a dichroic mirror 52 having the capability of transmitting blue wavelengths (approximately 450 to 500 milli-microns) and reflecting the longer wavelengths, and through a collector lens 54 to a photomultiplier tube which senses the intensity of the blue light transmitted by film B.

Another part of the blue beam is reflected by the neutral beam splitter 42 and the mirror 43, and passes through the lens pair 45 to the second film A. The blue light, transmitted through the film A, passes through a dichroic blue light transmitting mirror 49 and a collector lens 51 to the channel A photomultiplier tube 53.

As mentioned above, the outputs of the photomultiplier tubes 53 and 56 are video information signals that are fed through the switches 53a and 56a in the positions shown to the enhancement system 58, represented by a block in FIGURE 2, where an enhancement signal is generated, as described in greater detail below. The enhancement signal is coupled to the grid terminal 30a of a second cathode ray scanner tube 30, scanning an identical pattern in synchronism with the first scanner tube 32. The electronic characteristics of this tube is such that its electron beam is practically invisible in the absence of an enhancement signal at its grid terminal 30a.

The beam from the scanner tube 30 passes through a color filter 30b, such as a red transmitting filter, interposed between the scanner tube and the first neutral beam splitter 40. The "red" beam from this tube, scanning in unison with the "blue" beam of scanner tube 32, then follows the same optical path as the "blue" beam, except that the red beam is reflected by mirrors 49 and 52 into the stereo-microscope 55 where it may be observed by the operator of the apparatus.

Thus, the red beam will be observable anytime an enhancement signal is generated by the enhancement system 58, and will not be detected by the photomultipliers 53 and 56 because of the color selectivity of the mirrors 49 and 52. The blue beam, on the other hand, is not visible in the microscope, since mirrors 49 and 52 transmit all blue light components to the photomultipliers.

A standard stereo-microscope, such as the Bausch & Lomb #53–99–6009, can easily be modified for use with the invention by replacing the original front surface mirrors within the rhomboids by the dichrioc mirrors 49, 52 and the collector lenses 51, 54.

Referring again to FIGURE 2, film illumination by the strobe light 28 is accomplished by directing light from strobe source to the mirrors 60a and 60b from which it is reflected into the optical paths followed by the red beams, as previously discussed. The light source 10, used in the density measurement mode of operation, is also shown in FIGURE 2. Light from this source passes through a lens system 61 before being intercepted by the rotating shutter 12, whereafter the chopped light follows the same optical paths as the blue light in the manner described above.

In the enhancement mode, illumination takes place during the retrace portion of the horizontal deflection cycle, and the strobe light 28 is activated during the blanking portion of the blue beam scan. The strobe light 28 is triggered during certain of the horizontal blanking times, the triggering frequency being 120 c.p.s. as previously mentioned. This frequency is sufficiently high so that the operator observes, through the microscope 55, film images which appear to be illuminated from an uninterrupted light source.

FIGURE 3 illustrates the basic elements of the enhancement system 58. The video signal outputs of the channel A and B photomultipliers, corresponding to the video information obtained from films A and B, are routed to gamma compensating amplifiers 64a and 64b. These amplifiers, the gain of which may be varied by the operator, compensate for the inherent gamma differences in the system gray scales of films having diverse contrast ranges and equivalent gammas. Such gamma compensating techniques are well known in the television art, where it is common to "distort" the slope (gamma) of the brightness-transfer characteristic curve in order to compensate for inherent limitations in television cameras and picture tubes.

From the gamma amplifiers 64a and 64b the two video information signals may follow one of two selected paths determined by the positions of the ganged switches 65a and 65b. With the switches 65a and 65b in the "area" positions an enhancement signal is produced which enhances or emphasizes with a red overlay from the red beam film areas scanned by the blue beam having different transmissivities. For this position of the switches 65a and 65b, the video signals from the gamma amplifiers 64a and 64b feed difference amplifiers 66a and 66b, respectively, which both produce video signals representative of the difference between the video information signals from the channels A and B. However, the input connections to the amplifiers 66a and 66b are so made that the amplifier 66a subtracts the output of channel B from the output of channel A, while the amplifier 66b subtracts the output of channel A from the output of channel B.

As shown by the representative waveforms in FIGURE 3, the video information signals at the outputs of the amplifiers 66a, 66b may consist of both positive and negative voltage peaks with reference to some quiescent signal level. Since the "red" scanner tube 30 is responsive only to signals above a certain amplitude level, and since it is desired to be able to enhance the density variations in the films without regard to which of the two information signals is the larger, the outputs of the amplifiers 66 are supplied to a rectifying amplifier 67 which provides a single polarity difference signal in terms of the absolute difference between the two information signals.

Under certain circumstances, however, film analysis can be facilitated by generating an enhancement signal only when a particular one of the video information signals from the channels A and B is larger than the other. For this purpose, the outputs of the amplifiers 66a and 66b and of the rectifying amplifier 67 can be utilized selectively by positioning a switch 68 to select any one of the three difference output signal waveforms.

The difference signal selected by the switch 68 is then filtered by the low pass filter 69 in order to eliminate relatively high frequency signal variations resulting from grain structure in the film, etc. A signal threshold amplifier 70 accepts the filtered signal and amplifies it to give a series of peaks or impulses corresponding to the instantaneous differences between the light transmissivities of corresponding elemental areas on the two films being viewed. A threshold level adjustment on the threshold amplifier 70 permits the operator to control the minimum signal amplitude to which the amplifier responds, thus purging low level noise from the video enhancement signal. Moreover, the negative difference signal peaks will also be eliminated by the threshold amplifier 70, since the threshold level is greater than zero. Because the threshold amplifier passes only the positive portion of the signal, it will be understood that there will be a threshold amplifier output only when the output of channel A is greater than the output of channel B or the output of channel B is greater than the output of channel A, depending on which is selected by the switch 68. With the switch 68 in the intermediate position, there will be a threshold amplifier output when either of the channel outputs is greater than the other.

From the threshold amplifier 70, the modified video difference signal goes to a switch 71 which, in the "Area" position, supplies an output amplifier 72, the output of which is fed into the grid terminal 30a of the "red" scanner tube 30.

If enhancement of edge differences rather than area differences is desired, the switches 65a and 65b and 71 are moved to the "Edge" positions. This supplies the outputs of the A and B channels to conventional differentiating circuits 74a and 74b, the differentiated video signals from each channel then being fed to a difference amplifier 76 to produce a difference signal. The difference signal can be fed to apparatus of the kind described above for providing three alternative difference signals and for selecting one of the three. For simplicity, however, the output of the difference amplifier 76 is shown connected only to a rectifying amplifier 77 which may be similar to the amplifier 67. The output of the rectifying amplifier 77 is then fed through the switch 71 in the "Edge" position and through the output amplifier 72 into the "red" scanner tube grid terminal 30a.

Differentiation of the video signals from the gamma compensating amplifiers 64a and 64b produces a differentiated signal which is representative of the time derivative of the light transmissivities of corresponding elemental areas of the films A and B along the scanning line at the film. After the signals are compared in the difference amplifier 76, the resultant difference signal provides enhancement only of the edges of the film image where differences in transmissivity exist. Thus, by selecting either "edge" or "area" enhancement, the operator can obtain either a red edge outline or a red area overlay superimposed on the illuminated films A and B. Illustrative signal waveforms are illustrated at various points in FIGURE 3.

Referring now to FIGURE 4, the density measuring system 16 is shown in detail. In the density measurement mode of operation, the switches 53a and 56a and 23 (FIG- URE 1) are in the "Density" measurement positions. The light pulses produced by interruption of the light source 10 (FIGURE 2) by the rotating shutter 12, impinge upon the photomultipliers 53 and 56 producing electrical pulses in the outputs thereof which are routed into conventional delay and gate circuit means 80. The delay and gate circuit means 80 is triggered by pulses from the synchronizing amplifier 20 (FIGURE 1) to pass the outputs of the photomultipliers 53 and 56 to the low pass filters 82a, 82b during that portion of the chopped cycle in which light from light source 10 is being received by the photomultipliers. During a part of the "off" portion of the cycle, when light from the source 10 is being interrupted, the photomultipliers 53 and 56 are cut off by a disabling signal from the cut-out unit 29 which is driven by pulses from the strobe trigger circuit 26. The strobe light 28 is triggered at this time, in the manner explained above. During the rest of the dark, or "off," portion of the light cycle, the delay and gate circuit means passes into the low pass filters 84a, 84b the redundant, or "error," light signal corresponding to the output of the photomultiplier tubes 53 and 56 during the "off" portion when the strobe light 28 is also off.

The signals passed to the low pass filters 82a, 82b, and 84a and 84b are pulses of uniform widths, so that the filtered outputs are the direct current averages of the gated pulses. The outputs of filters 82a, 82b, and 84a, 84b correspond to the film light transmission and redundant light error, respectively, the outputs of filters 84a, 84b being opposite in polarity to the outputs of filters 82a, 82b. The outputs of the filters 82a and 82b are fed to a difference amplifier 86a in which a subtraction of the error signal from the light transmission signal is performed, so that the amplifier output is a "true" light transmission signal for the A film channel.

Similarly, the outputs of the filters 82b and 84b are subtracted in a difference amplifier 86b to provide an output that is a "true" light transmission signal for the B film channel. Thus, measurement error resulting from light leakage into the system from the ambient surroundings is eliminated.

Film densities are correlated to film light transmission by the equation $D = -\log T$, where D is the density and T is light transmission. Accordingly, the transmission-representing voltage outputs of the amplifiers 86a and 86b are converted to density-representing voltages by passing them through conventional log conversion units 88a and 88b, the outputs of which are fed to the direct-reading density instruments 90a and 90b. Alternatively, the log function can be generated at the operational difference amplifier 86. The outputs from units 88a and 88b may also be supplied to a density difference measuring instrument 92, which provides a visible reading representative of the arithmetic difference between the optical densities of films A and B.

It is apparent that the scanning means, (i.e., the cathode ray flying spot scanner tubes), need not scan with visible light. Thus, an invisible radiant energy beam may be used with equal effectiveness, and it would be necessary merely to select optical system and detecting components responsive to the invisible beam frequency. It is also obvious that conventional methods may be used to permanently record any of the visual or electronic signals for later reviewing or subsequent analysis.

The embodiment of the invention described above is illustrative only, it being understood that many modifications and variations may be made by one skilled in the art without departing from the spirit and scope of the invention. All such modifications and variations, therefore, are intended to be included within the scope of the appended claims.

I claim:

1. Apparatus for analyzing information bearing records comprising first means for simultaneously scanning separate information-bearing record areas with a radiant energy beam to obtain video information signals representing, respectively, the information recorded in said record areas, means for comparing the video information signals to generate a difference signal, second scanning means in synchronism with the first means and having a radiant energy beam whose intensity is modulated in accordance with said difference signal, means for visually displaying images of said record areas and means for visually displaying the modulated beam from the second scanning means in superimposed, coordinated relation to said record area image.

2. Apparatus in accordance with claim 1 in which the modulated beam from said second scanning means is displayed in color.

3. Apparatus in accordance with claim 1 together with means interposed between said scanning means and said comparing means for differentiating the video information signals to produce a superimposed beam image representing outlines of differences in the information contained in the respective record areas.

4. Apparatus in accordance with claim 1, in which the record image displaying means comprises a light source for illuminating said records to form said images, and means for periodically energizing said source in synchronism with said first scanning means to produce said images when said first scanning means is inactive.

5. Apparatus for analyzing light transmitting information-bearing records comprising a first cathode ray tube for scanning separate light transmitting record areas with a light beam tracing out a raster scan, photosensitive means responsive to light from said beam transmitted through said record areas for generating information signals representative thereof, means for comparing the information signals to obtain a difference signal, a second cathode ray tube scanning in synchronism with the first cathode ray tube and having a light beam whose intensity is modulated in accordance with said difference signal, means for visually displaying an image of at least one of the record areas, and means for displaying light from the modulated light beam in superimposed registered relation to said record area image.

6. In an apparatus for viewing and obtaining indications of the optical density of information-beaming, light transmitting media, the combination of means for directing a light beam of periodically varying intensity to a light transmitting medium, photosensitive means responsive to the light from said beam transmitted through said medium for producing a signal representative of the light transmission therethrough, means synchronized with the periodic variations of said light beam for illuminating said medium during periods when said beam is of minimum intensity to produce images of information contained on the medium, and optical means receiving said images for viewing presentation, whereby the light transmitting properties of the medium may be determined while the medium is being viewed.

7. Apparatus in accordance with claim 6, together with means for converting said light transmission representative signal into a signal proportional to the optical density of said medium.

8. In an apparatus in accordance with claim 7, means synchronized with periodic variations of said light beam for generating, during periods when said beam and said illuminating means have minimum intensities, a second signal representative of a residual amplitude of the light-transmission signal, and means for combining said second and light-transmission signals to correct said light transmission representative signal.

9. Apparatus for comparing the optical densities of a plurality of information bearing light transmitting media comprising, in combination, a light source for producing a light beam of periodically varying intensity, first optical means for dividing said beam and directing one of the plurality of beams produced thereby through each of the media, photosensitive means responsive to the intensity of the light beam transmitted through each medium for generating signals representative thereof, means synchronized with the intensity variations of said light source for illuminating said media during periods when sad beam is of minimum intensity to develop images of the information contained therein, and second optical means for receiving said images for viewing presentation.

10. In an apparatus in accordance with claim 9, gating means for passing at least one of said signals when said beam and said illuminating means have minimum intensities to produce a signal representing residual illumination of said photosensitive means, means for subtracting said residual signal from said light transmission-representative signals to obtain a third signal representative of the difference therebetween, and means for taking the logarithm of said third signal, whereby a signal proportional to the optical density of the medium is obtained.

11. Apparatus in accordance with claim 10, in which a density-proportioned signal is developed for each of the light transmission-representative signals, the apparatus further comprising means for comparing at least two of said density-proportional signals.

12. Apparatus in accordance with claim 10 comprising means for converting said light transmission-representative and said residual signals into direct current signals before taking the difference therebetween.

13. A method for analyzing information recorded on information-bearing records, comprising the steps of simultaneously scanning separate information-bearing record areas with a first radiant energy beam to obtain video information signals representative, respectively, of the information carried thereby, comparing the information signals to generate a difference signal representative of the comparison thereof, modulating with the difference signal the intensity of a second radiant energy beam synchronized with the first beam, illuminating said information-bearing record areas while scanning them with said first radiant energy beam to produce visible images thereof, and displaying the second radiant energy beam in viewing registration with said record area images.

14. A method in accordance with claim 13 in which the first and second radiant energy beams are visible light beams.

15. A method in accordance with claim 13 comprising the step of differentiating said information signals before comparing them to generate the difference signal.

16. Apparatus for comparing information contained in separate areas of record media, comprising:

scanning tube means productive of a scanning beam of a first spectral content;
optical means for directing said beam to simultaneously scan the separate information bearing areas;
photosensitive means responsive to modulation of said scanning beam by the information in the respective areas to produce video signals representative thereof;
a source of illumination;
means synchronized with said scanning means for periodically energizing said source of illumination when said scanning beam is inactive to produce images of the information contained in the respective areas;
means receiving at least one of said images to present it for viewing;
second scanning tube means producing a synchronous beam of a second spectral content for scanning the areas in registered relationship to the first scanning beam;
means including dichroic filter means in a common optical path to said first and second scanning beams for directing said second scanning beam to the viewing means in superimposed, viewing relation to said one image and for blocking passage of such second scanning beam to the photosensitive means; and
means jointly responsive to said video signals for producing a difference signal to modulate the intensity of the second scanning beam.

17. Apparatus according to claim 16, further comprising:
means operable in synchronism with source energizing means for rendering said photosensitive means unresponsive during the periods of source energization.

References Cited

UNITED STATES PATENTS

| | | | |
|---|---|---|---|
| 3,376,382 | 4/1968 | McCalla | 178—6.8 |
| 2,679,636 | 5/1954 | Hillyer | 88—14 |
| 2,903,507 | 9/1959 | Kovasznay | 178—6 |
| 2,964,644 | 12/1960 | Hobrough | 88—14 |
| 2,977,407 | 3/1961 | Hirsch | 178—5.2 |
| 3,340,359 | 9/1967 | Fredkin | 178—7.87 |

ROBERT L. GRIFFIN, *Primary Examiner.*

J. A. ORSINO, JR., *Assistant Examiner.*

U.S. Cl. X.R.

250—217; 178—6, 7.87; 88—14